United States Patent

[11] 3,566,151

| | | |
|---|---|---|
| [72] | Inventor | Frederick W. Wilburn<br>Southport, England |
| [21] | Appl. No. | 805,463 |
| [22] | Filed | Mar. 10, 1969 |
| [45] | Patented | Feb. 23, 1971 |
| [73] | Assignee | Pilkington Brothers Limited<br>Liverpool, England |
| [32] | Priority | Mar. 18, 1968 |
| [33] | | Great Britain |
| [31] | | 13,026/68 |

[54] TEMPERATURE CONTROL CIRCUITS
8 Claims, 5 Drawing Figs.

[52] U.S. Cl. .................................................. 307/117,
219/492, 219/497, 219/501
[51] Int. Cl. .................................................. H01h 35/00
[50] Field of Search.............................................. 307/117;
219/492, 494, 497, 501, 510; 323/22(SCR)

[56] References Cited
UNITED STATES PATENTS

| | | | |
|---|---|---|---|
| 2,666,889 | 1/1954 | Ehret et al. .................. | 219/492X |
| 3,157,801 | 11/1964 | Sheguen ....................... | 307/117 |
| 3,196,255 | 7/1965 | Beauchamp et al. .......... | 219/501X |
| 3,231,719 | 1/1966 | De Viney et al. ............. | 219/497 |
| 3,315,063 | 4/1967 | Ihlenfeldt ..................... | 219/497 |
| 3,443,121 | 5/1969 | Weisbrod ...................... | 307/117 |

Primary Examiner—Robert K. Schaefer
Assistant Examiner—H. J. Hohauser
Attorney—Morrison, Kennedy & Campbell ABSTRACT: A circuit for controlling the heating current flowing through a load according to a predetermined temperature/time function includes a thyristor circuit which controls the power supplied to the load and a firing circuit for the thyristor circuit. The output from a thermocouple associated with the load is compared with a voltage representing a predetermined temperature/time function to produce a control output which is connected to the firing circuit.

Fig. 1.

Inventor
FREDERICK WALTER WILBURN

TEMPERATURE CONTROL CIRCUITS

BACKGROUND OF THE INVENTION

This invention relates to temperature control circuits and in particular to a control circuit for controlling according to a predetermined temperature/time relation the heating current flowing through an electrical load.

Temperature controllers have been proposed in which mechanical arrangements are employed, for example cam controllers, in which a cam controls the rotation of a wiper on a potentiometer element. Such controllers are subject to many disadvantages, in particular motors and gear trains have to be employed, and the cam has to be changed in order to achieve control of different rates of heating or cooling by the temperature controller. Further such potentiometer arrangements are very liable to wear and have to be replaced from time to time.

It is a main object of the present invention to provide an improved temperature controller which employs solid-state devices and achieves a very stable control of temperature according to a predetermined temperature/time function, with greater stability than has been possible hitherto of the relationship between the actual temperature variation and the desired temperature function.

SUMMARY

According to the invention a control circuit for controlling the heating current flowing through an electric load according to a predetermined temperature/time function, comprises a thyristor circuit connecting the load to an alternating current supply, a firing circuit connected to the trigger input of the thyristor circuit, a thermocouple associated with the load, and a summing amplifier having one input connected to the thermocouple and a second input connected to a function generator which is operable to generate the voltage representing said temperature/time function, the amplifier output being connected to the firing circuit so as to transmit thereto a potential level to control the time during each cycle of the supply current when the thyristor circuit is triggered, thereby controlling the heating current supplied to the load in accordance with said predetermined function.

The predetermined temperature/time function may be a linear temperature/time relationship but other functions can be generated according to the invention by operating on a basic function generator which produces a linear output.

Further according to the invention the function generator comprises a high stability analogue amplifier which is shunted by a polyester capacitor, and an adjustable voltage supply circuit is connected to the input of the analogue amplifier, the setting of said voltage supply circuit determining the rate of change of voltage at the output of the analogue amplifier.

Control may further be provided according to the invention of the temperature at which the control circuit is functional so far as controlling the temperature/time relationship in the electrical load is concerned. That is the circuit can be adjusted to determine the temperature at which the control begins during a heating process, or the temperature at which the control ends during a cooling process.

From this aspect of the invention the input to the analogue amplifier may be connected to act as a summing amplifier by two parallel resistors in the input, one being connected to said adjustable voltage supply circuit and the other being connected to means for deriving an adjustable voltage representing the temperature at which control of the heating current by the function generator begins.

The control circuit may be employed for controlling either a rate of heating or a rate of cooling over a long period, and the adjustable voltage supply circuit may further comprise a potentiometer connected to a DC voltage source through a reversing switch, whereby the polarity of the supply is reversible to provide control of the rise or the fall of the temperature of the load by the function generator.

A still further feature of the circuit of the present invention is the provision of an arrangement for preventing the temperature of the load from exceeding a predetermined maximum value. To this end the analogue computer may be shunted by a voltage limiting diode in parallel with said polyester capacitor, one electrode of the diode being connected to the output of the analogue amplifier through a potentiometer which is connected in a resistor chain extending between a fixed potential supply and earth, the setting of the potentiometer determining a voltage, corresponding to the maximum temperature of the load to be achieved, at which the voltage limiting diode conducts.

In a modification of the invention for use with a nonlinear thermocouple the circuit may include a second analogue amplifier connected between the function generator output and the second input to the summing amplifier, and a series of parallel-connected shunt circuits shunting the second analogue amplifier and each including a diode and a potentiometer, the potentiometer being settable so that the shunt circuits are switched in successively as the amplifier output varies, thereby adjusting the gain of the amplifier to match the temperature/voltage characteristic of the thermocouple.

In some circumstances an approximation only to the temperature/voltage characteristic of the thermocouple can be achieved with a simple diode circuit replacing the second analogue amplifier. This simpler circuit includes a diode connected between the function generator output and a fixed voltage in a sense such that the diode conducts and modifies the function generator output when that output reaches a predetermined voltage.

A closer approximation can be achieved in another modification of the circuit according to the invention by including a plurality of diodes connected to the function generator output, and each returned to a different fixed voltage so that the diodes are switched into conduction in succession as the function generator output passes through predetermined voltages and said output is made to approximate to a temperature/time curve matching the temperature/voltage characteristic of the thermocouple.

The thyristor circuit through which the heating current is switched to the electrical load may comprise only a single thyristor so that heating current is only switched through the load on one-half cycle of the alternating current supply, that is either on the negative half-cycle or on the positive half-cycle.

In a preferred embodiment of the invention the thyristor circuit includes two thyristors connected in parallel opposing and in series with the alternating current supply and the electric load, the trigger electrodes of both thyristors being connected to the firing circuit so that the thyristors conduct on the positive and negative half-cycles respectively of the alternating current supply.

BRIEF DESCRIPTION OF THE DRAWINGS

In the drawings the like references indicate the same or similar parts.

DESCRIPTION OF THE PREFERRED EMBODIMENTS

Figure 1:
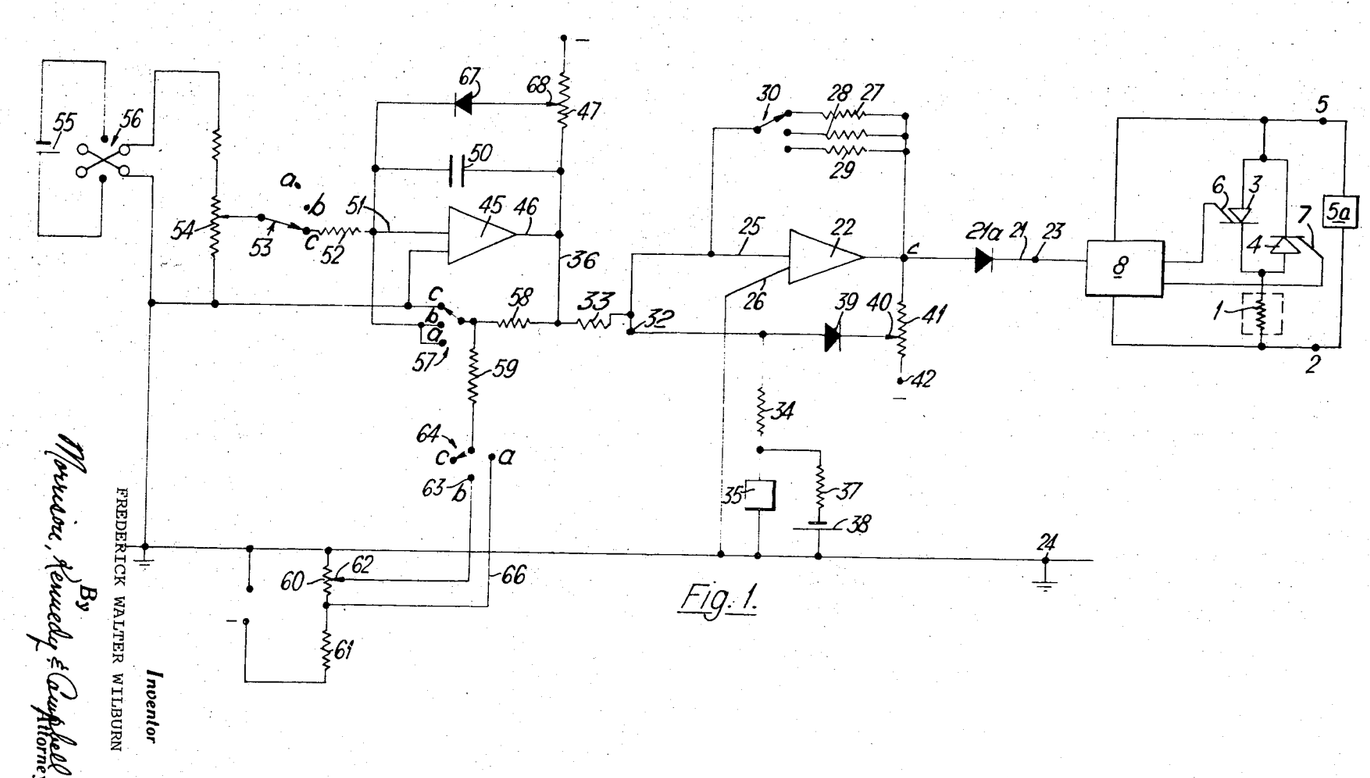
FIG. 1 illustrates a control circuit for controlling the heating current flowing through an electric load in order to maintain a linear temperature/time relationship during heating or cooling of the load.

Referring to FIG. 1 of the drawings the heating elements of an electric furnace are indicated by a load resistor 1 one end of which is connected to one terminal 2 of an alternating source of electric current which supplies power to the heating elements. The load resistor 1 is connected in series with two thyristors 3 and 4 which are connected in parallel opposing. The other end of the parallel-connected thyristors 3 and 4 is connected to the second terminal 5 of the AC source 5a.

Because the thyristors 3 and 4 are connected in parallel opposing, as shown in FIG. 1, one thyristor conducts on each positive half-cycle of the AC supply and the other thyristor conducts on each negative half-cycle. The triggering of the thyristors is controlled in known manner by the supplying of a triggering potential to the trigger electrodes 6 and 7 respectively.

Figure 2:
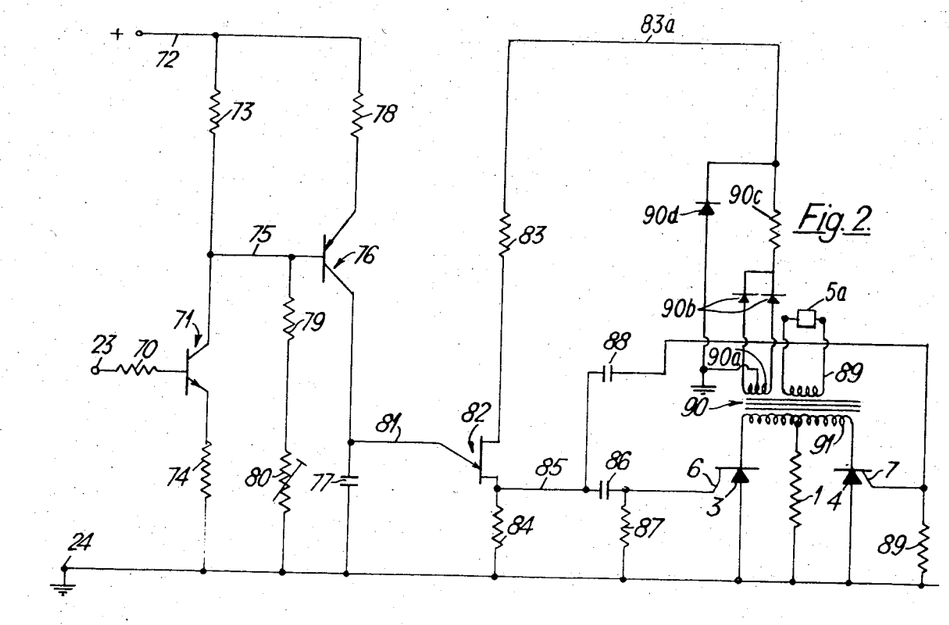
FIG. 2 is a detailed circuit of a thyristor firing circuit which is illustrated diagrammatically in FIG. 1.

The triggering potential is supplied to each of the thyristors 3 and 4 in the form of a series of voltage impulses derived from a firing circuit 8 power for which is supplied from the AC source 5a as shown in FIG. 2, so that operation of the firing circuit 8 is in phase with conduction of the thyristors 3 and 4. This firing circuit is illustrated in detail in FIG. 2 and is controlled by a DC potential representative of the amount of power to be supplied to the furnace in the form of current flowing through the load resistor 1. The firing circuit 8 converts this DC voltage input into a train of triggering impulses for both the thyristors, which pulses are so timed that they control the time during the respective half-cycles of the AC supplied between terminals 2 and 5, at which each thyristor is triggered and also ensures that when a thyristor has been triggered it remains conducting for the rest of the half-cycle of the AC supply.

That is the input from the firing circuit 8 to the trigger electrodes 6 and 7 of thyristor 3 is a pulse train beginning at a time during each half-cycle of the AC supply, determined by the DC potential supplied to the firing circuit 8, thereby controlling the heating current flowing in the load resistor 1.

The DC potential input to the firing circuit 8 is a negative potential which is developed on an output line 21 connected to the output of a summing amplifier 22. The DC potential is generated between two terminals 23 and 24 and lies within the range 0 to 10 volts. The terminal 24 is earthed. A diode 21a is connected in the output line 21 so that only negative-going signals control the firing of the thyristors.

The summing amplifier 22 has two input lines 25 and 26 and is shunted by one of a series of resistors 27, 28 and 29 which can be selectively connected across the amplifier 22, by means of a switch 30 the wiper of which is connected to the input line 25 to the amplifier.

The input line 26 is earthed, and the input line 25 is connected to a common point 32 which acts as a virtual earth, because the input current flowing in the input line 25 to the summing amplifier is so small as to be insignificant.

Two resistors 33 and 34 are connected to the virtual earth point 32, and the resistor 33 is connected to a function generator which generates an electrical potential which represents the desired rate of change of the temperature of the furnace.

The resistor 34 is connected in series with a thermocouple 35 the other side of which is earthed. The thermocouple 35 is mounted in the furnace which is being controlled, and the voltage generated in the thermocouple 35 is supplied as one input to the summing amplifier.

The gain of the summing amplifier 22 is controlled by the value of the resistance shunting the amplifier, and in setting up the amplifier, first the resistor 27 which has the lowest value of the three resistors 27, 28 and 29 is switched in; then the resistor 28 of next highest value is switched in by the switch 30; followed by the switching in of resistor 29 of highest value of the three. The gain of the summing amplifier 22 then approaches infinity, and the output from the amplifier, which is a DC potential on line 21, is directly proportional to the difference between the voltage supplied across resistor 33 from a line 36 and the voltage generated in the thermocouple 35. If the temperature of the furnace falls below a required temperature determined by the temperature/time function which is to be followed, there is a positive input to the summing amplifier 22 and a negative output which is proportional to the furnace temperature error.

Tendency of the furnace to become too hot is reflected in the thermocouple output and the output from the summing amplifier approaches zero. The firing circuit 8 does not fire either of the thyristors and there is no current supply to the load, until the gradual change in the controlling potential on line 36 has caught up with the thermocouple voltage representing the actual furnace temperature.

If the difference between these two voltages is zero, then there is no output from the amplifier and the line 21 is at earth potential and does not operate the firing circuit 8 so that neither of the thyristors 6 and 7 is fired and again no current is supplied to the furnace load resistor 1.

In practice there is always a slight out-of-balance and a tendency for some heating current to flow in the load and the control circuit operates to maintain the furnace temperature and hence the thermocouple voltage in strict agreement with a desired temperature/time regime.

A resistor 37 is connected in series with a 1.5 volt battery 38 between the output end of the thermocouple and earth. When the thermocouple 35 is operating correctly the voltage which it generates is of a sufficient value to swamp the effect of the voltage in the shunting circuit comprising the 1.5 volt battery and the resistor 37. If however, the thermocouple should break down, the battery supplies a "fail-safe" voltage to the summing amplifier input across the resistor 34, so ensuring that the amplifier generates a large DC output of reverse polarity which results in nontriggering of the thyristors and the overheating of the load 1.

A current limiting diode 39 is connected between the virtual earth point 32 and slider 40 on a potentiometer 41 connected between the amplifier output line 21 and a terminal point 42 which is connected to a source of negative potential.

The position of the slider 40 on the potentiometer 41 determines at what level of the voltage on the line 21 the diode 39 begins to conduct. When the diode conducts it is an effective low resistance shunt across the amplifier 22 so that the gain of the amplifier is effectively reduced to zero and the output on the line 21 falls to zero. The setting of the potentiometer 40, 41 thus controls the level at which the amplifier 22 ceases to produce an output for operating the firing circuit 8. That is the setting of the slider 40 on the potentiometer 41 controls the upper limit of the DC range of output voltage for firing the thyristors and supplying heating current to the furnace load.

This gives an upper limit to the current supply to the furnace and so safeguards the furnace from excessive additional current supply.

The voltage on line 36 which is a function representing the desired temperature/time regime for the furnace is generated by a function generating circuit including an analogue amplifier 45. The output from the analogue amplifier 45 is on line 36 which is connected by a potentiometer 47 to the negative voltage supply.

In the embodiment illustrated a linear temperature/time function is generated to control a linear heating of a furnace. For example, it may be desired that the temperature of the furnace shall rise gradually at a steady rate from, say 200 C. to 1,200 C. over a period of 10 hours.

The amplifier 45 and its associated circuitry operates to provide on line 36 a linearly increasing voltage of great accuracy over the whole of the working period, which voltage serves as a standard against which the thermocouple voltage is continuously compared, so that a linear rate of rise of temperature is maintained.

The amplifier 45 has a very high input impedance and low drift and hence a very low input current. The amplifier is shunted by a polyester capacitor 50, e.g. a polycarbonate capacitor, which has a very high leakage resistance, for example, a leakage resistance greater than 10 ohms.

Operation of the amplifier 45 is such that for a fixed input voltage on input line 51 the output voltage on line 36 increases at a linear rate. The output voltage on line 36 is a positive voltage which is compared with the negative output voltage from the thermocouple 35.

The constant input voltage to the amplifier 45 on line 51 is supplied through an input load resistor 52 and is switched by a three-position switch 53, having contacts a, b and c, from a potentiometer 54 which is supplied from a 1.5 v. source, for example a 1.5 battery 55 connected across the potentiometer 54 through a reversing switch 56.

The effect of the reversing switch 56 is to reverse the polarity of the control voltage supplied to the input line 51 of the amplifier 45. An input of one polarity on line 51 gives a positive slope to the potential on line 21 when the heating of the furnace is being controlled, and reversal of the switch 56 gives a negative slope to the voltage on line 21 for controlling the cooling of the furnace.

Associated with the function generator amplifier 42 there are circuits for controlling the start temperature at which the function generator begins to control the heating of a furnace and also for setting the maximum temperature to be reached under the control of the circuit.

In order to determine the start temperature at which the control circuit begins to control the heating of the furnace a start control circuit is incorporated in the circuit of the analogue amplifier 45. A second three-position switch 57, which has contacts a, b and c, and which is gauged to the switch 53, is connected to the input line 51 of the amplifier 45 and the wiper of the switch 57 has connected to it a resistor 58 which is effectively connected across the amplifier 45 when the switch 57 is in the a or b position. A resistor 59 also connected to the wiper 57 acts as an input resistor to the amplifier 45 when the switch 57 is in position a or position b.

The resistor 59 is connected to the wiper of a third three-position switch 64, which is gauged to the switches 53 and 57 and also has three contacts a, b and c. The voltage switched to resistor 59 by the switch 64 is derived from a chain of two resistors 60 and 61 which are connected between a standard potential supply, e.g. −15 volts, and earth. The resistor 60 is a potentiometer having a slider 62 which is connected to contact 64b of the switch 64. The contact 64a is connected to the common point of resistors 60 and 61.

With the gauged switches 53, 57 and 64 in the b position, which is the start position, the switch 53 is open, the switch 57 connects resistors 58 and 59 to the input line 51 of the amplifier 45, and the switch 63 connects resistor 59 to the slider 62 on the potentiometer 60. The setting of the slider 62 is adjusted to determine the start temperature at which the circuit is to take control of the current flowing through the load resistor 1. This adjustment is such that there is zero output from the summing amplifier 22 when the furnace is at the temperature at which control is to begin.

With the switch 57 in the b position and the resistors 58 and 59 connected to the input line 51, the analogue amplifier 45 has the additional effect of acting as a summing amplifier with the set voltage from the potentiometer 60 fed into the input of the summation circuit.

If operation is to start from cold the start temperature potentiometer 60, 62 is set so that the whole of the temperature rise of the furnace from room temperature is under control of the circuit.

In other circumstances it may be necessary to commence control of the furnace from a higher initial temperature. The start temperature potentiometer 60, 62 is set to a reading corresponding to that initial temperature, and if the furnace is initially cold its temperature rises rapidly to that start temperature, and when that start temperature is reached the function generator takes control and the continual rise from the start temperature is under control of the function generated by the amplifier 45 and its associated circuit.

The switches 53, 57 and 64 are set to the a position when setting up the maximum temperature which is to be reached. The values of the resistors 60 and 61 are chosen so that the voltage on line 66 corresponds to the highest temperature capability of the furnace.

A diode 67 is connected between the line 51 and the slider 68 of potentiometer 47. The slider 68 is adjusted so as to set the voltage at which the diode 67 conducts as being a voltage on the output line 36 of amplifier 47 corresponding to the maximum temperature which is to be reached. When that temperature is exceeded the diode 67 conducts and keeps down the voltage output from the amplifier 45. That is the diode effectively acts as a voltage limiting circuit.

Thus both the start temperature and the maximum temperature to be achieved can be easily set and adjusted giving great versatility of operation of the circuit.

The switches 53, 57 and 64 are then set to the c, or run position in which the running of a circuit is under control of the voltage applied to input time 51 of the amplifier 45.

The adjustments of the control of the circuit in particular the adjustment of the potentiometer 54 which sets into the circuit the desired rate of rise of temperature of the furnace, can be a graduated dial control which can be easily set up by an unskilled operator.

The firing circuit 8 and the thyristors 3 and 4 controlling the supply of current through the load 1 are illustrated in more detail in FIG. 2. The input terminal 23 between which and earth, indicated at the point 24, a negative potential is developed to control the firing circuit, is connected through an input resistor 70 to the base of a transistor 71 forming a first amplifier stage. The emitter and collector of the amplifier transistor 71 are respectively connected to a supply line 72 maintained at a positive potential, and earth through load resistors 73 and 74.

The output from the transistor 71, which is an amplified DC control potential is transmitted on a line 75 to a second amplifier transistor 76 to whose collector there is connected a capacitor 77 whose function is important in the generation of the pulse train for controlling the conduction of the thyristors 3 and 4. The emitter of transistor 76 is connected to line 72 through a load resistor 78 and the coupling line 75 is connected to earth through two resistors 79 and 80 in series, the resistor 80 being variable to control the bias on the base of the transistor 76, which alters the current flow into the capacitor 77 when its base potential varies according to the output from transistor 71. This varies the charging time of capacitor 77 and hence determines the time when a firing pulse occurs.

A line 81 connects the capacitor 77 to the emitter of a unijunction transistor 82. Base-two of transistor 82 is connected by load 83 resistor to the supply line 83a which is supplied with a partially rectified supply derived from the AC supply 5a. The base-one electrode of transistor 82 is connected by a resistor 84 to earth. A pulse repetition rate of the pulse train output from the transistor 82 generated across resistor 84 is controlled by the charging and discharging of the capacitor 77, which is in turn controlled by the amplified DC potential derived from the potential existing across points 23 and 24.

The pulse train developed across resistor 84 is transmitted on line 85 through a coupling circuit comprising capacitor 86 and resistor 87 to the trigger electrode 6 of thyristor 3 and the same pulse train is coupled by capacitor 88 and resistor 89 to the trigger electrode 7 of thyristor 4. The power supply which is switched by the thyristors 3 and 4 to the load 1 is supplied from the source 5a through the input winding 89 of a power transformer 90. A secondary winding 90a on the transformer 90 has an earthed center tap and is connected through parallel rectifying diodes 90b and a load resistor 90c to the line 83a, which line is clamped by a Zener diode 90d so that the power supply to the firing transistor 82 is smoothed, but with a phase indicating component. The switching of the thyristors controls the transmission of power from the secondary winding 91 of transformer 90 into the load 1.

The circuit described with reference to FIG. 1 gives linear control of the heating of a furnace but control in accordance with other temperature/time functions may be achieved by inserting a diode function generator between the amplifiers 45 and 22 in order to convert the output from the amplifier 45 into a nonlinear function for feeding to the summation amplifier 22.

Figure 3:
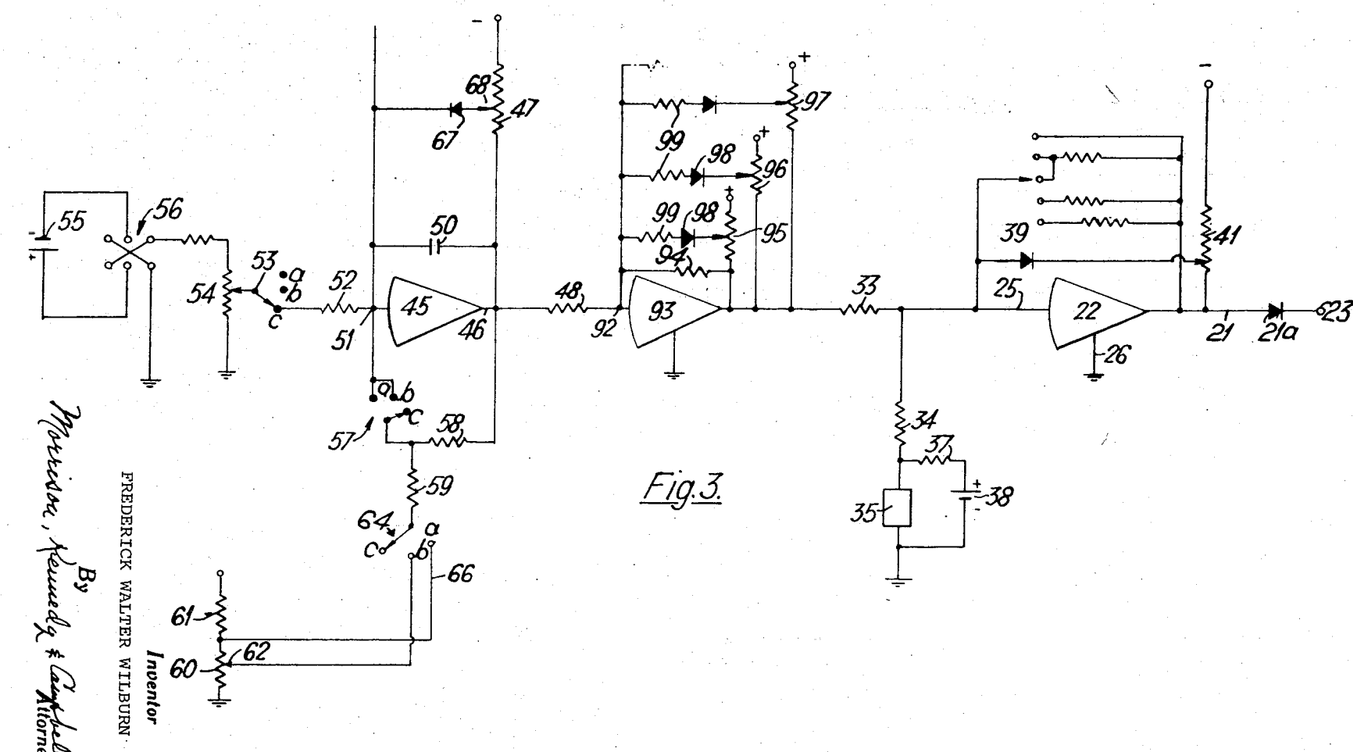
FIG. 3 illustrates a modification of the circuit of FIG. 1 including a diode function generator.

This enables a nonlinear thermocouple to be employed and in turn enables the invention to be used for controlling the temperature of a furnace up to temperatures much higher than has been possible hitherto. With the known Cromel-Alumel thermocouples linear control is only possible up to about 1,000° C. but the circuit according to the invention may be modified as illustrated in FIG. 3 to permit the use of a platinum/platinum-rhodium thermocouples which is effective up to about 1,500° C.

With this type of thermocouple a linear control of the rise or fall of temperature is achieved by providing a nonlinear input to the summation amplifier 22 which is a voltage/time curve approximating to the same law as that of the thermocouple for a constant heating rate.

The output from the amplifier 45 is connected to the input 92 of a further analogue amplifier 93, and the output from the amplifier 93 is connected to the input resistor 33 of the summation amplifier 22.

A resistor 94 which determines the normal gains of the amplifier 93 shunts the amplifier, and connected in parallel with the resistor 94 are a series of potentiometers three of which are shown at 95, 96 and 97. More potentiometers may be included if necessary and each is connected to a positive supply. The slider on each potentiometer is connected through a diode 98 and a resistor 99 to the input line 92 of the amplifier 93. Three parallel diode-resistor-potentiometer branches of the feedback network are illustrated but more in parallel with these may be provided if desired. The setting of each of the potentiometers is such that the diode connected to that potentiometer does not conduct until the output from the amplifier 93 reaches a predetermined voltage. As the output potential rises the branches are switched in successively in parallel with resistor 94 so that as the output voltage varies the change in resistance of the network lowers the gain of the amplifier. This results in the curve of output voltage plotted against the input voltage of the amplifier 93 having a form approximating to a curve consisting of a number of straight line sections of differing slopes. This curve approximates to the temperature/voltage characteristic curve of the thermocouple 35 and by increasing the number of branches of the diode-resistor network the curve of the output of the amplifier 93 can be made to approximate more closely to the curve representing the nonlinear thermocouple characteristic.

In this way the shape of the output from the diode function generator which is developed across resistor 33 is adjusted by means of the potentiometers 95, 96, 97 to approximate to the slope of the thermocouple characteristics in particular temperature ranges, and nonlinearity of the thermocouple is compensated for. The use of this circuit permits accurate control of the heating of a furnace up to about 1,500° C.

Figure 4:
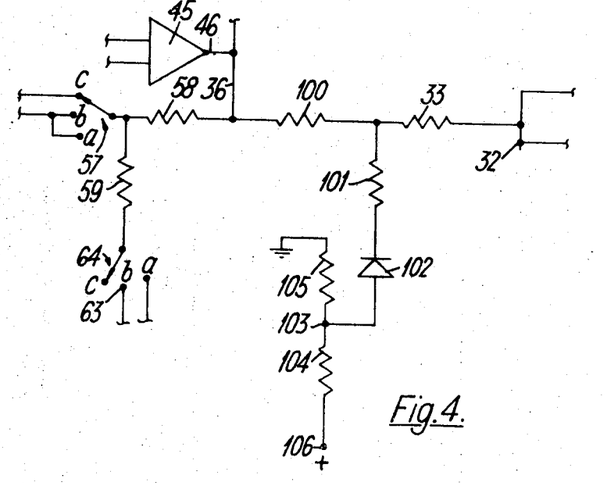
FIG. 4 illustrates a simple modification of the circuit of FIG. 1 for varying the temperature/time relationship during heating or cooling of the load.

When a simple approximation only to the curve thermocouple characteristics is required the circuit of FIG. 1 may be modified in the manner illustrated in FIG. 4. The resistor 58 which is connected to the output from the analogue amplifier 48 is connected through a further resistor 100 to the input resistor 33 of the summing amplifier 22. Connected to the junction of the resistors 100 and 33 is a further resistor 101 connected in series with a diode 102 which is connected to a fixed voltage at point 103 on a resistor chain 104, 105 connected between a fixed positive voltage at point 106 and earth.

At the beginning of a control cycle the diode 102 is cut off by the output from the function generator being more positive than the point 103. As operation proceeds the function generator output reaches a predetermined voltage at which the diode 102 begins to conduct. The diode circuit then shunts the output from the function generator to cause an alteration in the slope of the temperature/time relationship which is a simple approximation to the curve of the characteristic of the thermocouple.

Figure 5:
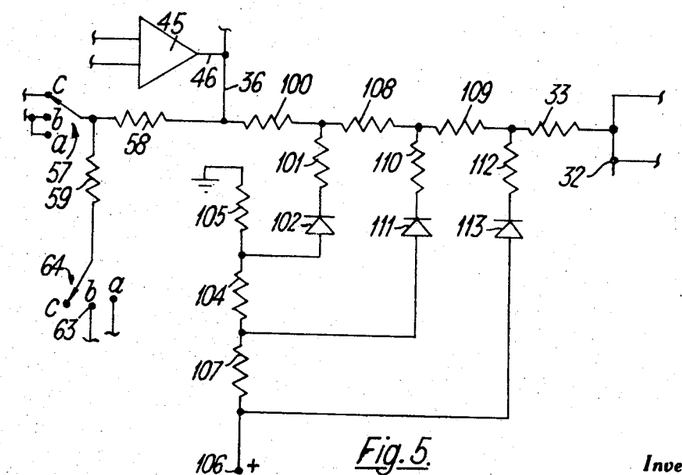
FIG. 5 is an elaborated version of FIG. 4 in which a closer approximation to a desired temperature/time relationship is achieved.

A more sophisticated though still simple modification of the linear output from the function generator is illustrated in FIG. 5. There are three resistors 104, 105 and 107 in the chain between the point 106 and earth. In series with the resistor 100, which is connected to the function generator output, there are two further resistors 108 and 109 which are also in series with the input resistor 33 of the summing amplifier. The junction of resistors 108 and 109 is connected through a resistor 110 and diode 111 to the junction of resistors 104 and 107, and the junction of resistors 104 and 107, and the junction of resistors 109 and 33 is connected through a resistor 112 and a diode 113 to the point 106.

When the voltage output from the function generator falls linearly the diode 102 is the first to conduct and thereafter the diodes 111 and 113 are switched into conduction in succession as the function generator output passes through predetermined voltages. This results in the input to the summing amplifier from the function generator approximating more closely to a curve matching the temperature/voltage characteristic of the thermocouple.

The circuit illustrated in FIG. 3 provides a more accurate control, but in some circumstances for example when operating near to 1,000° C. the modification of FIG. 4 or FIG. 5 can be sufficient to provide a desired accuracy.

The invention thus achieves the control with great accuracy of a temperature regime over long periods of time both for a gradual heating and for a gradual cooling, for example the rate of rise or fall of the temperature of a furnace or of a sample in a furnace may be varied, using the control circuit of the invention at rates from 1° C. to 50° C. per minute.

I claim:

1. A control circuit for controlling the heating current flowing through an electrical load according to a predetermined temperature/time function, comprising a thyristor circuit connecting the load to an alternating current supply, a firing circuit connected to the trigger input of the thyristor circuit, a thermocouple associated with the load, a function generator comprising a high stability analogue amplifier which is shunted by a polyester capacitor, and an adjustable voltage supply circuit connected to the input of the analogue amplifier, the setting of which voltage supply circuit determines the rate of change of voltage at the output of the analogue amplifier representing said temperature/time function, a summing amplifier having one input connected to the thermocouple and a second input connected to the output of the analogue amplifier, and an output from the summing amplifier connected to the firing circuit so as to transmit thereto a potential level to control the time during each cycle of the supply current when the thyristor circuit is triggered, thereby controlling the heating current supplied to the load in accordance with said predetermined function.

2. A circuit according to claim 1, wherein the input to the analogue amplifier is connected to act as a summing amplifier by two parallel resistors in the input, one being connected to said adjustable voltage supply circuit and the other being means for deriving an adjustable voltage representing the temperature at which control of the heating current by the function generator begins.

3. A circuit according to claim 1, wherein the adjustable voltage supply circuit comprises a potentiometer connected to a DC voltage source through a reversing switch, whereby the polarity of the supply is reversible to provide control of the rise or the fall of the temperature of the load by the function generator.

4. A circuit according to claim 1, including a voltage limiting diode shunting the analogue amplifier in parallel with said polyester capacitor, one electrode of the diode being connected to the input of the analogue amplifier through a potentiometer which is connected in a resistor chain extending between a fixed potential supply and earth, the setting of the potentiometer determining a voltage, corresponding to the maximum temperature of the load to be achieved, at which the voltage limiting diode conducts.

5. A circuit according to claim 1, including a second analogue amplifier connected between the function generator output and the second input to the summing amplifier, and a series of parallel-connected shunt circuits shunting the second analogue amplifier and each including a diode and a potentiometer, the potentiometers being settable so that the shunt circuits are switched in successively as the amplifier output varies, thereby adjusting the gain of the amplifier to match the temperature/voltage characteristic of the thermocouple.

6. A circuit according to claim 1, including a diode connected between the function generator output and a fixed voltage in a sense such that the diode conducts and modifies the function generator output when that output reaches a predetermined voltage.

7. A circuit according to claim 6, including a plurality of diodes connected to the function generator output, and each returned to a different fixed voltage so that the diodes are switched into conduction in succession as the function generator output passes through predetermined voltages and said output passes through predetermined voltages and said output is made to approximate to a temperature/time curve matching the temperature/voltage characteristic of the thermocouple.

8. A circuit according to claim 1, wherein the thyristor circuit includes two thyristors connected in parallel-opposing, and in series with the alternating current supply and the electrical load, the trigger electrodes of both thyristors being connected to the firing circuit so that the thyristors conduct respectively on the positive and negative half-cycles of the alternating current supply.

PO-1050
(5/69)

UNITED STATES PATENT OFFICE
CERTIFICATE OF CORRECTION

Patent No. 3,566,151    Dated February 23, 1971

Inventor(s) Frederick W. Wilburn

It is certified that error appears in the above-identified patent and that said Letters Patent are hereby corrected as shown below:

Column 3, line 44 "10 volts" should read -- -10 volts-

Column 4, line 63 "200 C" should read --200°C-- line 64 "1,200 C" should read --1,200°C-- line 75 "10 ohms" should read --$10^{14}$ ohms--

Column 6, line 47 "the" should read --a--

Signed and sealed this 29th day of June 1971.

(SEAL)
Attest:

EDWARD M. FLETCHER, JR.
Attesting Officer

WILLIAM E. SCHUYLER, JR
Commissioner of Patents